United States Patent [19]

Marten et al.

[11] Patent Number: 4,772,663
[45] Date of Patent: Sep. 20, 1988

[54] COPOLYMERS OF VINYL ALCOHOL AND ACRYLATES

[75] Inventors: Finn L. Marten, Macungie; Amir Famili, Schnecksville, both of Pa.; Dillip K. Mohanty, Blacksburg, Va.

[73] Assignee: Air Products and Chemicals, Inc., Allentown, Pa.

[21] Appl. No.: 3,965

[22] Filed: Jan. 16, 1987

[51] Int. Cl.$^4$ ............................................... C08F 16/06
[52] U.S. Cl. ................................ 525/60; 526/329.5
[58] Field of Search ........................ 525/60; 526/329.5

[56] References Cited

U.S. PATENT DOCUMENTS

| | | | |
|---|---|---|---|
| 2,290,600 | 7/1942 | Neher et al. | 525/60 |
| 2,328,922 | 6/1949 | Neher et al. | 526/329.5 |
| 2,654,717 | 10/1953 | Rehberg et al. | 525/330.6 |
| 3,203,918 | 8/1965 | Goldberg et al. | 524/803 |
| 3,689,469 | 9/1972 | Inskip et al. | 525/60 |
| 4,119,604 | 10/1978 | Wysong | 524/377 |

OTHER PUBLICATIONS

Research Disclosure Article (Aug. 1977); 16025; Khanna et al.

*Primary Examiner*—Joseph L. Schofer
*Assistant Examiner*—J. Reddick
*Attorney, Agent, or Firm*—Michael Leach; William F. Marsh; James C. Simmons

[57] ABSTRACT

A vinyl alcohol copolymer comprising the following general structure

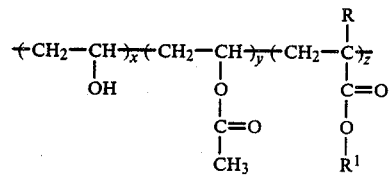

where
R is hydrogen or methyl;
$R^1$ is a $C_6$–$C_{18}$ hydrocarbyl group not containing an olefinic functionality;
x is 70 to 99.5% mole %;
y is 0 to 29.5 mole %; and
z is 0.5 to 8 mole %.

23 Claims, No Drawings

COPOLYMERS OF VINYL ALCOHOL AND ACRYLATES

TECHNICAL FIELD

The present invention relates to vinyl alcohol polymers and, more particularly, the invention relates to copolymers of vinyl alcohol with an acrylate.

BACKGROUND OF THE INVENTION

The end uses of vinyl alcohol polymers have been limited despite excellent strength, adhesive and barrier properties. This limitation is partly due to the fact that unplasticized vinyl alcohol polymers show little or no thermoplasticity before the occurrence of decomposition. Resolution of this problem has been sought through the use of external plasticizers such as ethylene glycol, neopentyl glycol and 2,2,4-trimethyl-1,3-pentanediol. However, the use of external plasticizers presents several disadvantages including increased moisture sensitivity, decreased tensile strength, leaching of the plasticizer and decreased oxygen gas barrier properties.

The internal plasticization of polyvinyl alcohol through the use of comonomers, grafting or post-reacton is known in the art. However, the comonomers normally contain ethyleneoxy groups which possess a high degree of water sensitivity. This water sensitivity leads to loss of oxygen barrier properties as water facilitates the diffusion of oxygen through the polymer matrix.

U.S. Pat. No. 2,290,600 discloses vinyl alcohol copolymers prepared from copolymers of vinyl esters with acrylic or methacrylic esters by converting the vinyl ester part of the copolymer into vinyl alcohol units under conditions whereby the acrylic or methacrylic part is not converted into acrylic or methacrylic acid units, respectively. Polymers containing as little as 3% by weight vinyl alcohol units are substantially tougher than the untreated copolymer or the corresponding 100% acrylic or methacrylic ester polymer. Preferably, the total number of vinyl alcohol units in the polymer is kept below 50% and for most purposes within the range from 20 to 2%.

U.S. Pat. No. 3,689,469 discloses a copolymer consisting essentially of 94 to 98 wt % vinyl alcohol and 2 to 6 wt % methylmethacrylate.

U.S. Pat. No. 4,119,604 discloses a copolymer which is 90 to 98 wt % polymerized vinyl alcohol units and 2 to 10 wt % of polymerized ester units which in monomeric form have the formula

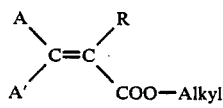

wherein A is hydrogen or methyl, A' is hydrogen or —COO—Alkyl, and R is hydrogen or methyl. Alkyl contains 1 to 4 carbons. This vinyl alcohol/unsaturated ester copolymer has a degree of hydrolysis in the range between 95% and 100% and has a viscosity between 10 and 60 cps.

U.S. Pat. No. 2,654,717 disclosed the polymerization of mono-unsaturated vinylic monomers containing at least one oxygen atom linked to carbon atoms (an ether linkage) including for example, monomeric compounds corresponding to the general formula $$CH_2=C(R)CO_2(CH_2CH_2O)_nR^1$$

where R is hydrogen or methyl, $R^1$ is aryl, aralkyl or alkyl group and n is 1 or 2.

U.S. Pat. No. 3,203,918 discloses copolymers of vinyl alcohol and beta-hydroxyalkyl acrylate esters wherein the alkyl group of the beta-hydroxyalkyl acrylate esters may contain from 2 to 4 carbon atoms. The copolymers are prepared by the polymerization and subsequent alcoholysis of copolymers of vinyl acetate and the beta-hydroxyalkyl acrylate esters. Films and coatings of such copolymers are characterized by their ability to remain soft and flexible in the absence of plasticizers.

SUMMARY OF THE INVENTION

The present invention provides a class of substantially homogeneous, random vinyl alcohol copolymers having the following general formula I:

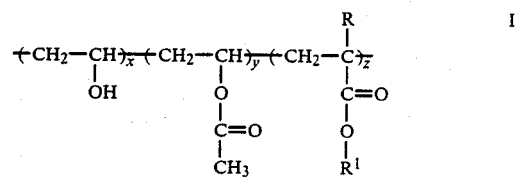

where
- R is hydrogen or methyl;
- $R^1$ is a $C_6$-$C_{18}$ hydrocarbyl group which does not contain an olefinic functionality;
- x is 70 to 99.5 mole %;
- y is 0 to 29.5 mole %; and
- z is 0.5 to 8 mole %.

The process for preparing the copolymers comprises (a) continuously feeding vinyl acetate monomer and an acrylate monomer of formula II to a reaction mixture in a reaction vessel, (b) polymerizing the vinyl acetate and acrylate monomer to yield a copolymer in the reaction mixture, (c) continuously withdrawing from the reaction vessel reaction mixture containing the copolymer, and (d) hydrolyzing (alcoholyzing) the acetate functionality of the copolymer to yield a vinyl alcohol copolymer.

Desirably, steps (a)–(c) are performed in such a manner as to attain a steady state condition in the reaction mixture.

The copolymers of the invention are easy to prepare in existing polyvinyl alcohol production equipment and offer a polymer having good thermoplastic and thermal stability properties. The copolymers for the most part retain the strength and excellent oxygen barrier properties of polyvinyl alcohol while adding flexibility and reduced water sensitivity.

DETAILED DESCRIPTION OF THE INVENTION

The invention provides a modified polyvinyl alcohol composition comprising a copolymer of vinyl alcohol, vinyl acetate and an acrylate ester of the general formula II:

where R represents H or CH$_3$; preferably CH$_3$; and R$^1$ represents a C$_6$-C$_{18}$ hydrocarbyl group which does not contain an olefinic functionality and preferably is a saturated hydrocarbyl group, for example, an alkyl group of the formula C$_n$H$_{2n+1}$ where n represents a number from 6 to 18; preferably 8 to 16; and most preferably 10 to 14. The alkyl group may be straight-chained or branched.

The hydrocarbyl group preferably contains 8-16 carbon atoms and desirably 10-14 carbon atoms. Further, the hydrocarbyl group should not contain any olefinic unsaturation in order to avoid another site of free radical polymerization which would lead to cross-linking.

The comonomers of formula II are the C$_6$-C$_{18}$ hydrocarbyl ester derivatives of an acrylic acid, namely acrylic acid or methacrylic acid. Examples of the hydrocarbyl moiety of the comonomer include hexyl, octyl (2-ethylhexyl), dodecyl (lauryl), tetradecyl (myristyl), hexadecyl (cetyl), octadecyl, cyclohexyl, phenyl, and benzyl. It is most preferred that the alkyl group be the lauryl group.

Contemplated as the functional, or operative, equivalent of the (meth)acrylate ester monomers for purposes of this invention are (meth)acrylamide monomers in which the amine moiety contains 6-18 carbon atoms.

Of the monomers of general formula II it is preferred to use the methacrylate esters, i.e. R is CH$_3$, because of their superior stability under alcoholysis conditions.

The comonomers of formula II are commercially available or can be prepared by transesterification of a lower acrylate ester with the desired higher alcohol or by directly esterifying the acrylic acid with the desired alcohol. The transesterification reaction and the direct esterification reaction are well known in the organic chemical field. The commercially available lauryl (C$_{12}$) methacrylate monomer is a mixture which also comprises methacrylate esters of C$_{14}$ and C$_{16}$ alcohols in lesser amounts.

The polymers of the invention are prepared by a free radical process using a train of continuous stirred tank reactors followed by a hydrolysis, or alcoholysis, reaction. Vinyl acetate, an acrylate comonomer or a mixture of such acrylate comonomers, free radical catalyst and methanol are added continuously to the first reactor. The acrylate comonomer can be added to subsequent reactors in order to maintain a homogeneous copolymer.

Unreacted vinyl acetate is removed from the exit stream by contacting it with methanol vapors in a stripping column yielding an intermediate vinyl acetate random copolymer having the general formula III:

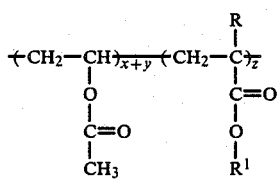

where
R is hydrogen or methyl;
R$^1$ is a C$_6$-C$_{18}$ hydrocarbyl group not containing an olefin functionality;
x is 70 to 99.5 mole %;
y is 0 to 29.5 mole %, and
z is 0.5 to 8 mole %.

The alcoholysis of the intermediate vinyl acetate copolymer is effected by the addition of a base catalyst. The resulting product is washed with methanol and dried to yield the vinyl alcohol/acrylate copolymer of formula I where R, R$^1$, x, y and z are as defined.

In the preferred embodiment of the copolymers of the invention, the number of carbon atoms in the hydrocarbyl group ranges from 8 to 16, x ranges from 80 to 99 mole %, y ranges from 0 to 19 mole % and z ranges from 1 to 6 mole %. In the most preferred embodiment, the number of carbon atoms in the hydrocarbyl group is from 10 to 14, x is from 85 to 98 mole %, y is from 0 to 13 mole % and z is from 2 to 4 mole %.

The degree of polymerization of the copolymers of this invention can range from about 100 up to 2500, but is preferably 200 to 800.

The vinyl alcohol/acrylate copolymers of the present invention can be prepared by the following process:

The vinyl acetate/acrylate copolymers are prepared by the use of a train of continuous stirred tank reactors. The vinyl acetate and acrylate are fed to the first reaction vessel in which the mxture is purged with an inert gas such as nitrogen. A free radical initiator solution for example t-butyl peroxypivalate dissolved in methanol, is combined with the above streams which are passed directly and continuously into the first reactor from which a stream of the polymerization mixture is continuously withdrawn.

The polymerization reaction mixture exiting the first reactor can be added to a second reactor together with additional initiator and additional acrylate in order to further increase the conversion of the initially added vinyl acetate.

Contemplated as the functional equvalent of vinyl acetate for purposes of this invention are the vinyl esters of formic acid and C$_3$-C$_{12}$ alkanoic acids.

Oxygen should, of course, be excluded during the polymerization. Such exclusion of oxygen is effectively achieved by employing a continuous polymerizer provided with a reflux condenser. Thus, when the polymerization reaction is performed continuously under reflux conditions, the polymerizer in effect becomes a system closed from the atmosphere.

The polymerization of the vinyl acetate and acrylate may be accomplished at temperatures ranging from 45° to 130° C., the preferred temperature ranging from 55° to 85° C. This temperature range will result in operating pressures in the range of 1 to 10 atm. Since the polymerization reaction is exothermic, the reaction is effected under reflux and/or with the aid of cooling means such as a cooling jacket for the polymerization reactor in order to control the temperature at the desired level.

The polymerization is normally performed in non-aqueous solutions, i.e. less than about 1 wt % water. The vinyl acetate stream and the acrylate stream can be diluted using C$_1$-C$_4$ aliphatic alcohols or other solvents such as the alkanoic esters of such alcohols which are inert to the polymerization initiator. Examples of suitable solvents are methyl acetate, ethyl acetate and the like with the preferred solvents being ethanol, propanol, butanol and especially methanol. A pure stream of any of the above solvents can be added continuously to the reactor.

Unpolymerized vinyl acetate is removed from the vinyl acetate/acrylate copolymer solution from the last polymerization vessel in a stripping column in which methanol vapor is employed as the stripping agent. An inhibitor such as hydrazine, hydroquinone, sulfur or quinone or the like can be added to the effluent stream prior to the stripping column. The purpose of the inhibitor is to prevent polymerization from occurring in the stripping column. The overhead fraction from the stripping column comprising unpolymerized vinyl acetate and methanol may be passed to a recovery system or, preferably, recycled to the polymerization process.

The bottom effluent from the stripping column comprises a solution of vinyl acetate/acrylate copolymer in methanol. This solution is passed directly to an alcoholysis system, particularly when the hydrolytic alcohol to be employed in the alcoholysis is methanol as will usually be the case.

The residence time in the polymerization reaction vessels, the monomer feed rate, the solvent concentrations, the initiator concentration and the polymerization temperature will generally be such that the monomer concentration in the polymerization reaction vessel will range from 2 to 85 wt %. As is well known to those skilled in the art, these variables will generally be controlled in accordance with the desired molecular weight of the vinyl acetate/acrylate copolymer intermediate which will comprise a random and substantially homogeneous distribution of vinyl acetate and acrylate units along the copolymer backbone.

Any free radical initiator which is soluble in the reaction mixture and possesses the desired half-life at the temperatures to be used may be employed in effecting the polymerization. Suitable initiators would include organic peroxides such as t-butyl peroxypivalate, di(2-ethylhexyl) peroxydicarbonate, t-butyl peroxyneodecanoate and 2,2'-azobisisobutyronitrile. The concentration of the initiator in the polymerization reaction mixture will normally range from 0.0001 to 2 wt %, the preferred concentration being 0.001 to 0.5 wt %.

A small amount of an acid may be added to the vinyl acetate stream prior to the first reaction vessel in order to limit the transesterification reaction between vinyl acetate and the added alcohol solvent. This reaction results in the formation of acetaldehyde which, besides being a chain transfer agent, is detrimental to the final product color. Examples of suitable acids include phosphorous acid, oxalic acid, citric acid, and tartaric acid, with the preferred acids being phosphorous and tartaric acids. The concentration of such acids in the polymerization reaction mixture would typically range from 2 to 50 ppm with the preferred range being 5 to 25 ppm.

In general, it is preferred that the amount of acrylate monomer combined with the vinyl acetate monomer to produce the copolymer be limited so as to yield the hydrolyzed copolymer containing about 2 to 40 wt % of the acrylate, i.e. about 0.5 to 8 mole %.

The above-described continuous polymerization procedure will afford a substantially homogeneous, random copolymer product as opposed to the product from a batch reaction process which is highly dependent on the reactive ratios of the monomers, the acrylate monomers being more reactive than the vinyl acetate. Thus, a batch process would yield a polymer having an initial section rich in acrylate units (little vinyl acetate) and the opposite end essentially vinyl acetate units. Upon phase separation of polymeric molecules rich in each monomer into a heterogeneous mixture, the polymer sections rich in the polymerized acrylate monomers will be deleterious to gas barrier properties.

The alcoholysis of the intermediate vinyl acetate/acrylate may be accomplished by any of the well-known procedures for the catalyzed alcoholysis of vinyl ester polymers. However, to prepare the copolymer products of the invention which are essentially free of acid and in which only the acyloxy portion of the vinyl acetate component is replaced wholly or partially by hydroxyl groups, basic hydrolysis should be employed. Although the method for preparing the vinyl acetate/acrylate copolymer intermediate under continuous polymerization conditions is preferred, the alcoholysis of such intermediate may be either batch or continuous process.

The patent literature describes various batch and continuous methods for the production of polyvinyl alcohols by the catalytic alcoholysis of polyvinyl esters. These methods are well applicable to the vinyl acetate/acrylate copolymers of the invention and include the batch method of U.S. Pat. No. 2,227,997.

The continuous method is disclosed in U.S. Pat. No. 2,642,419 in which the reactants are continuously mixed, the reaction mixture is poured or cast onto a moving surface, e.g. the belt or conveyor where gelling occurs, and the gel is removed from the surface before syneresis occurs. Once removed from the belt, the product is cut into smaller particles, washed with methanol and dried. The continuous method in U.S. Pat. No. 2,734,048 employing a slurry-type of alcoholysis may be practiced in carrying out the alcoholysis step of the present inventon. Since the methods of all the foregoing patents are well known, details thereof are incorporated by reference.

In general, ethanol or preferably methanol is used in the alcoholysis reaction at temperatures ranging from 20° to 100° C., but most desirably 35° to 65° C. The pressure is that which is sufficient to maintain liquid phase conditions.

The hydrolytic alcohol should be substantially anhydrous in that it does not contain more than 2 wt % and preferably not more than 0.2 wt % water. The alcohol content of the hydrolysis mixture should be such as to provide a suitable excess of the alcohol. Advantageously the alcohol used will be the same alcohol that was utilized for dissolving the vinyl ester in the production of the copolymer intermediate. The alcohol would generally constitute from about 30 to 90 wt %, preferably 35 to 75 wt %, of the alcoholysis reaction medium. Conversely, the solids content would generally be 10 to 70 wt %, preferably 25 to 65 wt % of the reaction mixture.

The by-product of the alcoholysis reaction will be the acetate ester of the hydrolytic alcohol. Such ester can be removed as it is formed during the alcoholysis or allowed to build up in the alcoholysis medium.

The alcoholysis catalyst can be any of the alkaline catalysts that are typically used, such as the alkali metal hydroxides and the alkali metal alcoholates. The alkali metal hydroxides, particularly sodium hydroxide, are especially preferred. The catalyst concentration in the alcoholysis mixture may range from about 0.05 to 10 wt % on polymer, but preferably 0.2 to 4 wt % on polymer.

The vinyl alcohol/vinyl acetate/acrylate copolymer product of this invention will contain vinyl alcohol, vinyl acetate and acrylate units randomly distributed along the copolymer backbone. These copolymers can be processed thermoplastically without any difficulty, for example, by molding, injecting molding and extrusion. The copolymers are suitable for the preparation of any shaped articles, for examples, plates, tubes, profiles, bottles, fibers and especially sheets. This thermoplastic processibility is surprising since unplasticized polyvinyl alcohol is not considered a thermoplastic polymer due to decomposition occurring prior to or simultaneously with melting. It is further surprising that the excellent oxygen barrier properties of the vinyl alcohol are retained to a large extent in the vinyl alcohol/acrylate copolymers which are at least about 92% hydrolyzed, i.e. substantially fully hydrolyzed.

The following examples were conducted at atmospheric pressure using two 2-liter reaction vessels in series. The reaction vessels were equipped with a mechanical agitator, a condenser, nitrogen inlet and a feed control system. The monomer/comonomer mixture (feed I), the solvent/initiator mixture (feed II), and the tartaric acid/solvent solution (feed III) were placed in different feed tanks and fed to the first reactor at a fixed rate through a metering pump while comonomer (feed IV) was fed to the second reactor. The desired number average and weight average molecular weights were achieved by controlling residence time, methanol to vinyl acetate ratio and initiator concentration as is well known in the art. The exit stream from the second reactor was passed down through a column filled with Raschig rings while methanol vapor was introduced in a countercurrent manner to remove any unreacted vinyl acetate which is condensed overhead. The stripping rate was conducted in a manner which reduced the vinyl acetate concentration in the intermediate copolymer solution to less than 0.07 wt %.

The alcoholysis was performed by feeding the copolymer solution and a 5 wt % sodium hydroxide solution in methanol through an in-line mixer and cast onto a belt where gelling occurred. The gel was removed from the belt, when the desired conversion was reached. Then it was cut into smaller particles, shortstopped with acetic acid, and washed with methanol.

The invention will be further illustrated by the following examples in which parts and percentages are by weight and feeds are in g/hr unless otherwise indicated.

EXAMPLE 1

The ingredients shown in Table I were charged to the above-described polymerization system using the described feeds:

TABLE I

|  | VAc | LMA* | INITIATOR** | MeOH | TARTARIC ACID |
|---|---|---|---|---|---|
| Initial Charge Reactor No. 1 (g) | 462 | 22.4 | 0.246 | 1000 | 0.02 |
| Initial Charge Reactor No. 2 (g) | 248 | 7.7 | 0.246 | 1084 | 0.02 |
| Feed I | 400 | 22.4 | — | — | — |
| Feed II | — | — | 0.80 | 150 | — |
| Feed III | — | — | — | 107 | 0.012 |
| Feed IV | 10 | 7.7 | — | — | — |

*Lauryl methacrylate
**Di(2-ethylhexyl) peroxydicarbonate

The mixture in the reactors was purged with nitrogen and brought to reflux by circulating hot water through the reactor vessel jackets. After one hour the feeds were pumped into the respective reactors at a fixed rate until a steady state condition in the system was reached in about 8 hours. The second reactor vessel effluent was introduced into the stripping operation at this point.

The stripped paste (40.0% solid) and a 5.0% solution of NaOH in methanol was fed to a mixer using flow rates of 555 g/min. and 66.0 g/min. respectively. The catalyst stream further contained 0.06% NaBH4. The slab collected from the mixer was kept at 44° C. for 12.5 minutes whereupon it was cut into small particles and added to a 0.5 wt % acetic acid/methanol solution, washed with methanol and dried. The properties of the alcoholysis product are described in Table IV.

EXAMPLE 2

This copolymerization was carried out in the same manner described in Example 1 except that the feeds charged to the reaction vessels were as shown in Table II.

TABLE II

|  | VAc | LMA | INITIATOR* | MeOH | TARTARIC ACID |
|---|---|---|---|---|---|
| Initial Charge Reactor No. 1 (g) | 228 | 12.96 | 3.6 | 1226 | 0.02 |
| Initial Charge Reactor No. 2 (g) | 87.63 | 5 | 2.7 | 1347 | 0.02 |
| Feed I | 430.8 | 13.96 | — | — | — |
| Feed II | — | — | 4 | 223 | — |
| Feed III | — | — | — | 742 | 0.02 |
| Feed IV | — | 3.85 | — | — | — |

*t-Butyl peroxypivalate

The stripped paste (48.6% solid) and a 5.1% solution of NaOH in methanol was fed to the mixer using a flow rate of 47.0 g/min.

The slab collected from the mixer was kept at 44° C. for 12.5 minutes whereupon it was cut into small particles and added to a 0.5 wt % acetic acid/methanol solution, washed with methanol and dried. The properties of the product are described in Table IV.

EXAMPLE 3

This copolymerization was carried out in the same manner as that described in Example 1 except that the feeds charged to the reaction vessels were as shown in Table III.

TABLE III

|  | VAc | LMA | INITIATOR* | MeOH | TARTARIC ACID |
|---|---|---|---|---|---|
| Initial Charge Reactor No. 1 (g) | 562 | 9.2 | 0.12 | 900 | 0.02 |
| Initial Charge Reactor No. 2 (g) | 348 | 3.3 | 0.12 | 984 | 0.02 |
| Feed I | 440.4 | 9.2 | — | — | — |
| Feed II | — | — | 0.12 | 120 | — |
| Feed III | — | — | — | 65 | 0.012 |
| Feed IV | 10 | 3.35 | — | — | — |

*Di(2-ethylhexyl) peroxydicarbonate

The stripped paste (26.96% solid) and a 5.25% solution of NaOH in methanol was fed to the mixer using a flow rate of 44.25 and 106.80 g/min. respectively.

The slab collected from the mixer was kept at 44° C. for 12.5 minutes whereupon it was cut into small particles and added to a 0.5 wt % acetic acid/methanol solution, washed with methanol and dried. The properties of the product are described in Table IV.

TABLE IV

| Copolymer | $\overline{M_n}^a$ | $\overline{M_w}^b$ | Mole % (wt %) Acrylate | Mole % PVOH | Mole % VAc | M.P. (°C.) | Melt Index$^c$ | O.T.$^d$ 90% | O.T.$^e$ 0% |
|---|---|---|---|---|---|---|---|---|---|
| V-107$^f$ | | 36,000 | 0 | 98.2 | 1.8 | Decomposed | 4.1$^h$ | | |
| WS-42$^g$ | | 77,000 | 0 | 97 | 3 | Decomposed | no flow | | |
| I | 52,500 | 145,000 | 3.2 (16.5) | 96.17 | 0.63 | 208 | 2.0 | 1.5 | 0.03 |
| II | 27,933 | 104,086 | 1.5 | 79 | 19.5 | 170 | 25 (190° C.) | | |
| IIIA | 90,000 | 150,000 | 1.73 | 98 | 0.27 | 220 | 0.1 (230° C.) | | |
| IIIB | 90,000 | 150,000 | 1.73 | 85 | 13.27 | 215 | 0.5 | | |

$^a$Number average molecular weight
$^b$Weight average molecular weight
$^c$ASTM D 1238-82
$^d$Oxygen Transmission at 90% relative humidity [cc/100 in$^2$/day/mil atm]
$^e$Oxygen Transmission at 0% relative humdity [cc/100 in$^2$/day/mil atm]
$^f$VINOL ® 107 is the trademark for a 98–98.8% hydrolyzed PVOH marketed by Air Products and Chemicals. Inc.
$^g$WS-42 is the trademark for a 96–98% hydrolyzed PVOH marketed by Air Products and Chemicals, Inc.
$^h$sample was severely decomposed
IIIA and IIIB differ in the degree of hydrolysis The melting points for the copolymers listed in Table IV were determined by DSC. It can be seen from the data in Table IV that the vinyl alcohol/lauryl methacrylate copolymers of the invention are thermoplastic compared to conventional polyvinyl alcohol and in the fully hydrolyzed case posses excellent oxygen barrier properties.

STATEMENT OF INDUSTRIAL APPLICATION

This invention provides a vinyl alcohol/alkyl acrylate copolymer which can be thermoplastically processed, optionally with a plasticizer, by molding, injection molding and melt extrusion into shaped articles possessing improved oxygen gas barrier properties.

We claim:

1. A substantially homogeneous random vinyl alcohol copolymer comprising the following general structure:

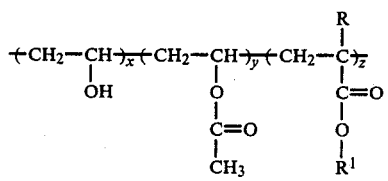

wherein
R is hydrogen or methyl;
R$^1$ is a C$_8$–C$_{16}$ hydrocarbyl group not containing an olefinic functionality;
x is 70 to 99.5 mole %;
y is 0 to 29.5 mole %; and
z is 0.5 to 8 mole %.

2. The copolymer of claim 1 in which R is methyl.

3. The copolymer of claim 1 in which R$^1$ contains 10–14 carbon atoms.

4. The copolymer of claim 1 in which x is 80–99 mole %, y is 0–19 mole % and z is 1–6 mole %.

5. The copolymer of claim 1 in which x is 85–98 mole %, y is 0–13 mole % and z is 2–4 mole %.

6. The copolymer of claim 2 in which x is 80–99 mole %, y is 0–19 mole % and z is 1–6 mole %.

7. The copolymer of claim 2 in which x is 85–98 mole %, y is 0–13 mole % and z is 2–4 mole %.

8. The copolymer of claim 1 in which R$^1$ is an alkyl group.

9. The substantially homogeneous random vinyl alcohol copolymer consisting essentially of the following general formula

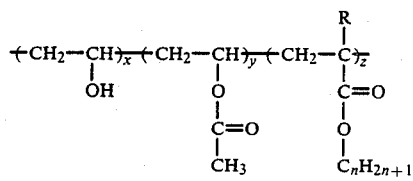

wherein
R is hydrogen or methyl;
n is a number from 8–16;
x is 70–99.5 mole %;
y is 0–29.5 mole %; and
z is 0.5–8 mole %.

10. The copolymer of claim 9 in which n is 10–14.

11. The copolymer of claim 9 which x is 80–99 mole %, y is 0–19 mole % and z is 1–6 mole %.

12. The copolymer of claim 9 in which x is 85–98 mole %, y is 0–13 mole, % and z is 2–4 mole %.

13. A substantially homogeneous random vinyl alcohol copolymer consisting essentially of the following general formula

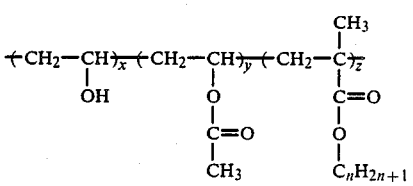

wherein
n is a number from 8–16;
x is 70–99.5 mole %;
y is 0–29.5 mole %; and
z is 0.5–8 mole %.

14. The copolymer of claim 13 in which x is 80–99 mole %, y is 0–19 mole % and z is 1–6 mole %.

15. The copolymer of claim 13 in which x is 85–98 mole %, y is 0–13 mole % and z is 2–4 mole %.

16. The copolymer of claim 13 in which n is a number from 10–14.

17. The copolymer of claim 16 in which x is 80–99 mole %, y is 0–19 mole % and z is 1–6 mole %.

18. The copolymer of claim 16 in which x is 85–98 mole %, y is 0–13 mole % and z is 2–4 mole %.

19. The copolymer of claim 16 in which x is at least 92 mole %.

20. The copolymer of claim 13 in which n is 12.

21. The copolymer of claim 20 in which x is at least 92 mole %.

22. The copolymer of claim 19 in which z is 2–4 mole %.

23. The copolymer of claim 21 in which z is 2–4 mole %.

* * * * *